United States Patent [19]

Gornall et al.

[11] Patent Number: 4,508,198
[45] Date of Patent: Apr. 2, 1985

[54] SPREADING TYPE DISC BRAKES FOR VEHICLES

[75] Inventors: Graham J. Gornall, Sutton Coldfield; Anthony G. Price, Birmingham; David Parry, Solihull, all of England

[73] Assignee: Lucas Industries, Birmingham, England

[21] Appl. No.: 490,199

[22] Filed: Apr. 29, 1983

[30] Foreign Application Priority Data

Apr. 30, 1982 [GB] United Kingdom ............ 8212585
Nov. 11, 1982 [GB] United Kingdom ............ 8232269

[51] Int. Cl.³ .................................. F16D 55/18
[52] U.S. Cl. .................................. 188/71.4; 188/72.6; 188/106 F; 188/218 A
[58] Field of Search ............... 188/71.4, 71.3, 218 A, 188/72.6, 72.7–72.9, 106 F, 72.2, 72.1, 72.4, 72.5, 71.7–71.9, 140 A, 366–368; 192/70, 70.23, 70.24; 92/187, 108, 129, 107, 130 A, 114

[56] References Cited

U.S. PATENT DOCUMENTS

| | | | |
|---|---|---|---|
| 3,245,499 | 4/1966 | Kershner | 188/71.4 |
| 3,392,805 | 7/1968 | Kreitner | 188/71.4 |
| 3,543,886 | 12/1970 | Campbell | 188/72.2 X |
| 4,089,392 | 5/1978 | Ostrowski | 188/72.2 X |
| 4,363,382 | 12/1982 | Anderson | 188/72.6 X |

FOREIGN PATENT DOCUMENTS 2067692 7/1981 United Kingdom ............ 188/71.4

Primary Examiner—Douglas C. Butler
Attorney, Agent, or Firm—Scrivener Clarke Scrivener and Johnson

[57] ABSTRACT

In a disc brake the application of the brake is initiated by angular movement of at least one pressure plate with respect to a reaction member to cause the pressure plate to move axially into engagement with a friction disc which, in turn, is urged into engagement with a surface in a stationary housing. The angular movement is effected hydraulically by an actuator comprising a piston working in a bore of a cylinder, the axis of which is substantially at right angles to that of the brake. The piston acts through a part-spherical rocking thrust coupling associated with a pull-rod passing through the actuator with a substantial clearance, the inner end of the pull-rod being pivotally coupled to a lug on the pressure plate, and the outer end being adapted for connection to a hand lever by which the pull-rod can be moved in a brake-applying direction. A thrust member is disposed between the piston and the spherical rocking coupling and is engagable with a thrust transmitting face on the piston for sliding movement in a transverse direction with respect to the axis of the cylinder to accommodate angular movement of the pull-rod when the brake is applied. The thrust member and the coupling are biassed towards each other by a compression spring so that the thrust member is restrained from moving radially with respect to the coupling when the brake application is effected by the hand lever. In another construction the spring is omitted and the biassing is achieved by the inherent resilience of a boot for sealing the outer end of the cylinder.

5 Claims, 5 Drawing Figures

SPREADING TYPE DISC BRAKES FOR VEHICLES

This invention relates to disc brakes for vehicles of the kind in which at least one friction disc rotatable within a stationary housing is adapted to be moved into engagement with a relatively stationary surface, and actuating means are provided for moving the disc into engagement with the said surface to apply the brake, the actuating means comprising at least one pressure plate which is located in the housing adjacent to the disc, and balls housed in recesses in the pressure plate and an adjacent face of a reaction member, actuating movement of the pressure plate relative to the reaction member in the plane of the pressure plate being accompanied by axial movement of the pressure plate to urge the friction disc into engagement with the stationary surface. The actuating movement of the pressure plate can be effected hydraulically by an actuator comprising a cylinder and piston assembly of which the axis is substantially normal to that of the brake and of which one component is fixed relative to the housing and the other is movable and acts through a so-called spherical rocking thrust coupling associated with a pull-rod passing through the actuator with a substantial clearance, and the pull-rod is adapted for connection to a manually-operable brake applying device, a hand lever for example, by means of which the pull-rod can be moved in a brake-applying direction and relative to the cylinder and piston assembly.

A brake of that kind is referred to below as "a brake of the kind set forth" and is particularly suitable for use in tractors and like vehicles.

GB-A-2 067 692 discloses a brake of the kind set forth in which a laterally slidable thrust member is placed between the movable component and the spherical rocking coupling in order to relieve the movable component of side loads on angular movement of the pull-rod when the brake is applied hydraulically. Whilst the arrangement illustrated in that specification works perfectly satisfactorily in most circumstances, it has occasionally been found that when the brake is applied mechanically the thrust member can become angularly displaced in a radial direction which may prevent the brake from being released fully. Clearly this is a potentially dangerous situation and one aspect of the invention is specifically concerned with solving this problem.

According to a our invention, in a brake of the kind set forth a thrust member is disposed between the movable component and the spherical rocking coupling, and the thrust member is engageable with a thrust transmitting face on the movable component for sliding movement in a transverse direction with respect to the axis of the piston and cylinder assembly, the thrust member and the spherical rocking coupling being biassed towards each other so that the thrust member is restrained from moving radially with respect to the coupling when brake application is effected by the manually-operable brake applying device.

The biassing may be achieved by a compression spring which acts on either the thrust member or the coupling.

Conveniently the spring acts between the thrust member and a shoulder on the piston of the piston and cylinder assembly or the spring may act between the coupling and a stone guard for the adjacent end of the cylinder.

In another construction the biassing is achieved by the resilience in the material of a boot for sealing an adjacent end of the housing. Conveniently the boot seals a space between the spherical rocking coupling and the adjacent wall of the housing.

Some embodiments of the invention will now be described by way of example with reference to the accompanying drawings, in which.

Figure 1:
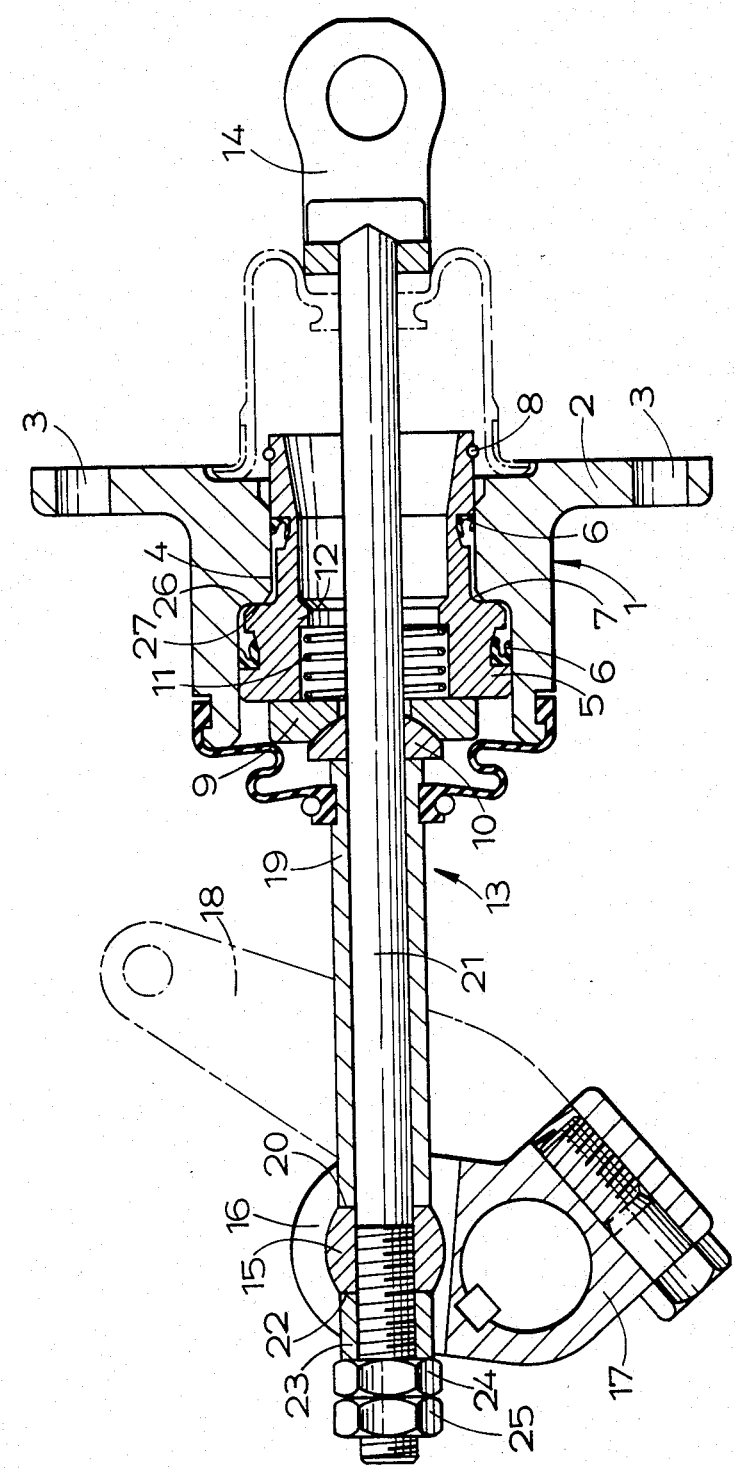
FIG. 1 is a longitudinal section through a brake-applying mechanism for a brake of the kind set forth.

Referring to FIG. 1 of the accompanying drawings, the mechanism includes an hydraulic cylinder 1 which is open at both ends and has an outwardly extending annular flange 2 at one end containing axial bolt holes 3. Although not shown, the cylinder is, in use, bolted to a housing of the brake which is formed with a peripheral opening surrounded by a seating for the flange 2. The axis of the cylinder 1 is substantially at right angles to that of the brake.

The cylinder 1 has a stepped bore 4 in which works a hollow annular stepped piston 5 sealed by axially spaced seals 6. The working space of the cylinder is the annular space 7 around the pistion at the step in diameter and a connection (not shown) is made to this space from a master cylinder or other source of fluid under pressure. Outward movement of the piston is limited by a circlip 8 located in an annular groove in the piston wall adjacent to its open inner end.

Seating on the outer end of the piston is an annular thrust member 9 having a part-spherical outer surface co-operating with a complementary surface on the inner end of a collar 10 to form a spherical rocking coupling. The thrust member 9 is of a low-friction material and has a sliding engagement for radial movement with the outer end of the piston 5 which is of greater diameter. The thrust member 9 is urged outwardly away from the piston 5 by a compression spring 11 located within the outer end of the piston 5. The inner end of the spring 11 bears against an annular abutment 12 formed on the inside of the piston.

Figure 4:
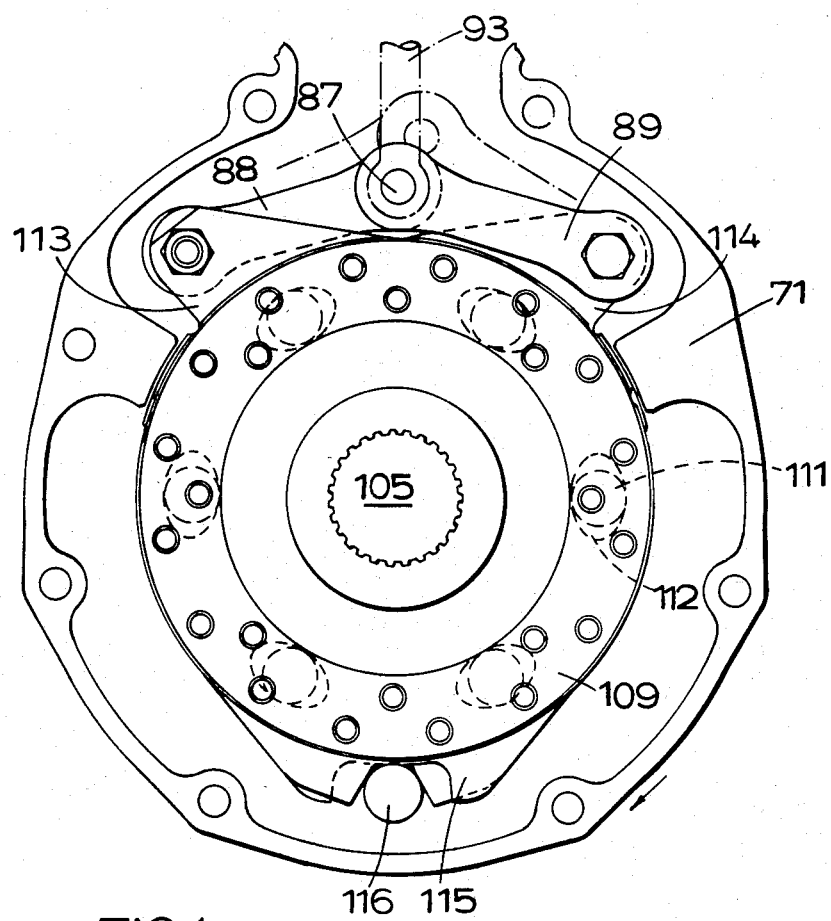
FIG. 4 is a transverse section through a brake of the self-energising spreading type.
Figure 5:
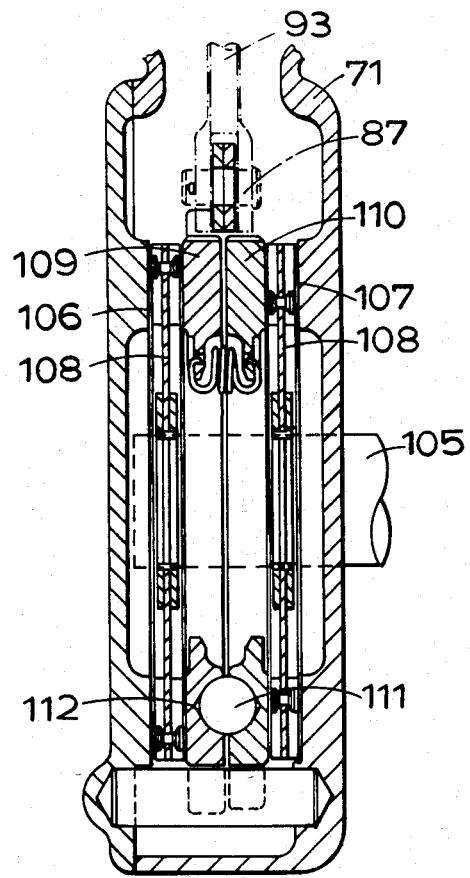
FIG. 5 is a longitudinal section through the brake shown in FIG. 4.

The collar 10 is associated with a force transmitting assembly 13 for transmitting a brake-applying force from the piston 5 to a clevis 14 which, in use, is pivoted to opposed toggle levers of which the opposite ends are connected to lugs on the pressure plates of a brake of the self-energising spreading type. (Such a brake is illustrated in FIGS. 4 and 5 of GB-A-2 067 692 and may be of the dry or of the oil-immersed type).

The force transmitting assembly 13 comprises a trunnion 15 which is journalled for rotation in a bifurcated crank 16 fast with a rotatable transverse shaft 17, and a radial brake-applying lever 18 is also fast with the shaft 17. A compression tube in the form of a distance piece 19 abuts at opposite ends between the collar 10 and a flat 20 on the trunnion 15. A pull-rod 21 extending through the tube 19 and the collar 10 also extends at its outer end through an opening in the trunnion 15 to act on a second flat 22 parallel with and diametrically opposed to the flat 20 through a thrust washer 23, a nut 24 and a lock nut 25. The inner end of the rod 21 is coupled to the clevis 14.

In the inoperative retracted position shown in the drawings a shoulder 26 at a step of the change in diameter of the piston 5 engages with a complementary shoulder 27 in the cylinder 1.

When the brake is to be applied hydraulically for normal service braking, hydraulic fluid under pressure is introduced into the annular space 7 to urge the piston 5 in an outwards direction with respect to the cylinder 1. This transmits a thrust to the trunnion 15 through the collar 10 and the tube 19 which in turn causes the crank 16 and the shaft 17 to rotate applying a tensile force to the rod 21 which moves in unison with the tube 19 to urge the toggle levers outwardly to apply the brake.

Circumferential movement of the clevis 14 with the toggle levers when the brake is applied is accommodated by the thrust member 9 sliding with respect to the outer end of the piston 5, with angular movement of the assembly 13 being accommodated by the collar 10 rocking in the recess in the thrust member 9.

When the brake is to be applied mechanically or manually, for parking or in an emergency, the lever 18 is moved angularly by a force applied to its outer end by a transmission line in the form of a rod or cable. The angular movement of the lever 18 imparts corresponding movement to the crank 16 which, in turn, withdraws the rod 21 from the brake housing to withdraw the toggle levers as described above. When this occurs, the tube 19, collar 10 and thrust member 9 are urged outwardly by the spring 11 so that they all travel in unison with the rod 21, the thrust member 9 becoming separated from the piston 5 which remains unaffected. The collar 10 thus remains correctly seated on the thrust member 9 so that when the lever 18 is returned to release the brake there is no danger of the rod 21 being held off its correct released position by the thrust member 9 having become displaced radially with respect to the collar 10.

The spring is, of course, not strong enough to move the crank 16.

The collar 10 and tube 19 may be formed in one piece.

In this embodiment, wear in the friction linings may be compensated for by screwing the nut 24 further onto the rod 21 to shorten its effective length. However, this calls for periodical manual checking and adjustment which is avoided in the embodiment of FIG. 2, which will now be described.

Figure 2:
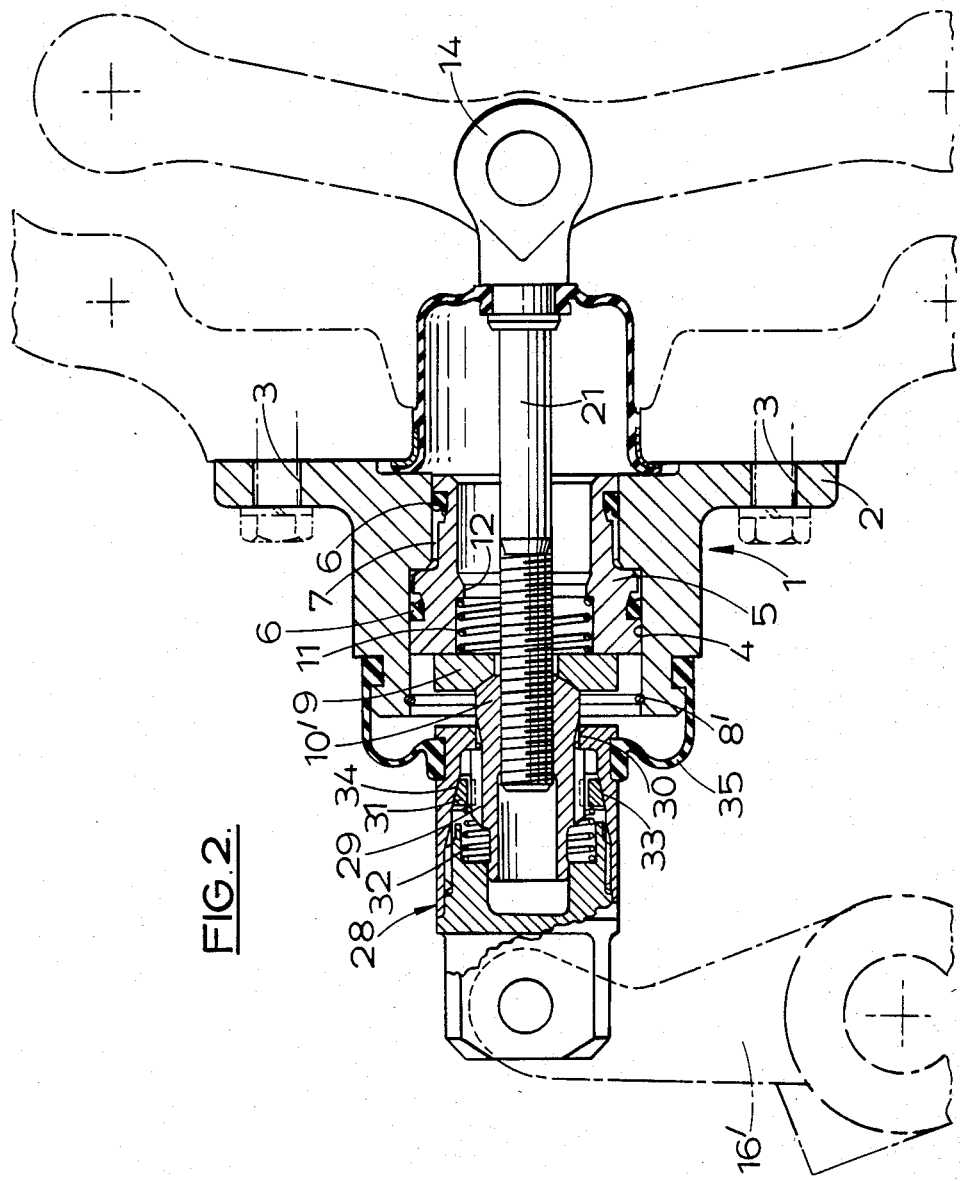
FIG. 2 is a longitudinal section through another such brake-applying mechanism.

Apart from a minor difference in that the outward movement of the piston 5 is limited by a circlip 8' located in an annular groove in the outer end of the cylinder wall, the main difference between FIGS. 1 and 2 lies in the manner in which the outer end of the pull-rod 21 is coupled to the transmission line and the thrust member 9. Parts which are generally similar to those of FIG. 1 have been given the same reference numerals.

The collar 10 of FIG. 1 is replaced by a sleeve 10' in screw threaded engagement with an end portion of the pull-rod 21. The inner end of the sleeve 10' forms a spherical rocking coupling with the thrust member 9. The outer end of the sleeve is slidably received within a housing 28 which is formed in two parts for ease of assembly. The outer end of the housing 28 is pivotally connected to a crank 16' which is arranged to be operated by a transmission line in a similar manner to the crank 16 of FIG. 1. Outward movement of the housing 28 relative to the sleeve 10' is limited by abutment of the end of a coarse fast thread 29 on the outside of the sleeve 10' with a radial shoulder 30 surrounding an opening at the inner end of the housing 28 and through which the sleeve 10' is otherwise guided to slide. A clutch ring 31 is carried in screw-threaded engagement with the fast thread 29 and is urged inwardly towards the shoulder 30 by a compression spring 32 so that an inclined peripheral face 33 of the clutch ring 31 is in frictional engagement with a complementary clutch face 34 on the inside of the housing 28. A degree of back lash defining the brake clearances is provided between the threads of the ring 31 and the sleeve 10'. Unless adjustment is required, the clutch ring 31 is held in frictional engagement with the face 34 during the brake-applying and brake-release operations.

A flexible boot 35 of an elastomeric material, suitably rubber, seals the housing 28 to the cylinder 1 to keep out water and other foreign matter.

When the brake is to be applied hydraulically the piston 5 transmits an outward thrust to the sleeve 10' which, because of its screw-threaded engagement with the pull-rod 21, applies a tensile force to the rod 21 to apply the brake, and angular movement of the rod 21 is accommodated by transverse sliding of the thrust member 9. The sleeve 10' moves rearwardly relative to the housing 28 which is held relatively stationary by the lever 16'. When the back lash in the threads is taken up, indicating that adjustment is required, the ring 31 is carried by the sleeve 10' out of frictional engagement with the clutch face 34 against the force in the spring 32. When the brake is released the force of the return spring of the brake moves the pull-rod 21 and the sleeve 10 in the opposite direction, with the ring re-engaging with the inclined face. After the back lash in the threads has been taken up again in the opposite direction, the engagement of the threads causes the sleeve 10' to rotate and shorten the effective length of the linkage to compensate for wear of the friction linings, since the frictional engagement of the ring with the face 33 is greater than that between the threads.

When the brake is to applied by the transmission line, the crank 16' moves angularly and acts through the abutment of the shoulder 30 on the housing 28 with the thread 29 to withdraw the rod 21 and apply the brake.

Figure 3:
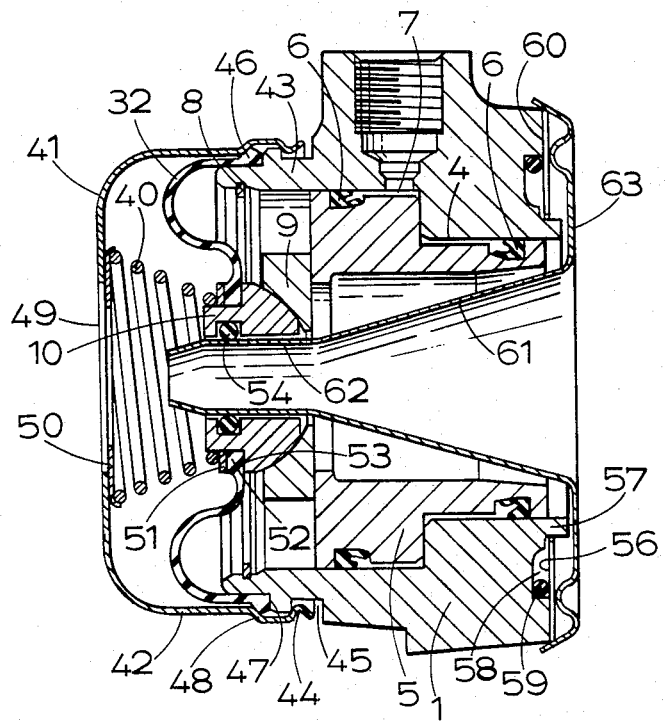
FIG. 3 is a longitudinal section through another brake-applying mechanism.

In the brake-applying mechanism illustrated in FIG. 3 the spring 11 is replaced by a compression spring 40 of conical outline, and the flexible boot 35 is enclosed within a snap-on stone guard 41 which encloses the adjacent end of the cylinder 1.

The stone guard 41 comprises a metal pressing having a cylindrical skirt 42 which receives a spigot portion 43 on that end of the cylinder 1. The skirt 42 has an inwardly directed radial rib 44 at its free end for engagement in a radial groove 45 in the spigot portion 43 to retain the guard 41 against axial movement with respect to the cylinder 1. A bead or thickening 46 at the outer edge of the boot 35 is received in a groove defined between an outwardly directed radial shoulder 47 on the spigot portion 43 and a complementary outwardly directed radial shoulder 48 on the skirt 42. The stone guard 41 is provided with a central aperture 49 through which the force-transmitting assembly projects.

The end of the spring 40 which is of greater diameter abuts against the stone guard 41 thorugh an annular retainer 50 and the end of the spring 40 which is of smaller diameter abuts against a retaining ring 51, in turn acting to urge an annular bend or thickening 52 against a radial shoulder 53 on the collar 10.

A seal 54 retained in a groove 55 in the bore of the collar 10 provides a seal against the force-transmitting assembly so that the outer end of the mechanism is fluid-tight. This has the advantage that when the mechanism is used with a brake of the oil-immersed type, the oil from the brake can enter the mechanism to provide lubrication between the relatively movable parts, namely between the collar 10 and the thrust member 9, and the thrust member 9 and the piston 5.

When the brake is applied mechanically, the pull-rod 21 is withdrawn through, and with respect to, the collar 10, and the spring 40 continues to bias the collar 10 towards the hydraulic cylinder 1 in order to clamp the thrust member 9 between the collar 10 and the adjacent outer end of the piston 5 whereby to prevent the thrust member 9 from being displaced radially with respect to the collar 10.

The cylinder 1 is particularly suitable for being clamped at its rear face 56 against the housing of a brake. The face has an axially projecting annular locating spigot 57 and is provided with a groove 58 to receive a sealing ring 59, as illustrated in the lower portion of the drawing. In an alternative construction shown in the upper portion of the drawing the sealing ring 59 can be replaced by a gasket 60 which spans the groove 58.

In transit and storage an insert 61 is inserted into the mechanism. The insert may be hollow as illustrated, or it may be of solid construction.

The insert 61 has a stem 62 which retains the ring 54 in the groove and a radial flange 63 which acts to retain either the seal 59 in the groove 58 or the gasket 60 against the face 56.

The construction and operation of the mechansim of FIG. 3 is otherwise the same as that of FIG. 1 and corresponding reference numerals have been applied to corresponding parts.

The capacity of the mechanism can be altered by changing the relative diameters of the two portions of the bore 4 and fitting a suitable piston in order to change the capacity of the annular space 7.

In a modification of the constructions described above with reference to FIGS. 1 and 3, the springs 11 and 40 are omitted, and the collar 10 and the thrust member 9 are biassed into engagement with each other by the inherent resilience of the material of the sealing boots 35.

The self-energising spreading type of brake illustrated in FIGS. 4 and 5 is adapted for braking a shaft for transmitting drive to a wheel of a vehicle. In the brake a shaft 105 extends into the housing 71, the housing 71 having spaced radial braking surfaces 106, 107 between which are located rotatable friction discs 108. The discs 108 are slidably keyed to the shaft 105, and together with the braking surface 106, 107 constitute the co-operating friction members having relatively rotatable friction surfaces.

Brake applying means for actuation by the pull-rod 94 comprises an expander mechanism in the form of two angularly movable pressure plates 109 and 110 in the form of rings located between the pair of discs 108, balls 111 located in oppositely inclined co-operating recesses 112 in adjacent faces of the plates 109, 110, and the pair of toggle levers 88, 89 for moving the pressure plates 109, 110 angularly in relative opposite directions.

The toggle links 88, 89 are connected between radially projecting lugs 113, 114 on the plates 109, 110 and one end of the pull-rod 94 is connected by the pin 87 to the junction of the links 88, 89.

Movement of the pull-rod 93 in the brake applying direction is effected by the brake applying mechanism and initiates the angular movement of the pressure plates 109, 110 in realtively opposite directions. The balls 111 then tend to ride out of the recesses 112 and urge the plates 103, 110 apart into engagement with the friction discs 108 which are then urged into engagement with the radial surfaces 106, 107 in the housing 104.

One of the pressure plates 109 is provided with a lug 115 which engages with a stop abutment 116 in the housing 71 to arrest the plate 109, whereby continued angular movement of the other plate 110 provides a servo action.

We claim:

1. A disc brake for vehicles comprising a housing having a relatively stationary surface, at least one friction disc rotatable within said stationary housing and adapted to be moved into engagement with said relatively stationary surface, and actuating means for moving said disc into engagement with the said surface to apply the brake, said actuating means comprising at least one pressure plate which is located in said housing adjacent to said disc, a reaction member, and balls housed in recesses in said pressure plate and an adjacent face of said reaction member, actuating movement of said pressure plate relative to said reaction member in the plane of said pressure plate being accompanied by axial movement of said pressure plate to urge the friction disc into engagement with said stationary surface, an hydraulic actuator for effecting actuating movement of the pressure plate hydraulically, said hydraulic actuator comprising a cylinder and piston assembly of which the axis is substantially normal to that of the brake and of which one component is fixed relative to said housing and the other is movable, and a spherical rocking thrust coupling through which said movable component acts, a pull-rod passing through the actuator with a substantial clearance and with which said rocking coupling is associated, and said pull-rod is adapted for connection to a manually-operable brake applying device by means of which said pull-rod can be moved in a brake-applying direction and relative to said cylinder and piston assembly, wherein said movable component has a thrust transmitting face, and said spherical rocking thrust coupling comprises a collar member, and a thrust member disposed between said movable component and said collar member, said thrust member being engageable with said thrust transmitting face on said movable component for sliding movement in a transverse direction with respect to the axis of said piston and cylinder assembly, and a compression spring being provided for biassing said thrust member and said collar member towards each other so that said thrust member is restrained from moving radially with respect to said collar member when brake application is effected by said manually-operable brake applying device, and wherein one of said components has a first spring abutment face, and one of said members has a second spring abutment face which is located adjacent to and spaced from said first spring abutment face, and said compression spring is located between the said one component and the said one member with opposite ends of said spring in abutment with said first and second abutment faces.

2. A brake as claimed in claim 1, wherein said first spring abutment face is provided on the said piston, and said second spring abutment face is provided on said thrust member.

3. A brake as claimed in claim 2, wherein said first abutment face comprises a shoulder on said piston.

4. A brake as claimed in claim 1 wherein said first spring abutment face is provided on said cylinder, and said second spring abutment face is provided on said collar member.

5. A brake as claimed in claim 4, wherein said second spring abutment is provided on a store guard forming part of said cylinder.

* * * * *